(12) United States Patent
Sakata et al.

(10) Patent No.: US 9,156,196 B2
(45) Date of Patent: Oct. 13, 2015

(54) METHOD OF MANUFACTURING OPTICAL ELEMENTS

(75) Inventors: Tadafumi Sakata, Kobe (JP); Youichi Ogawa, Sakai (JP); Kazunari Tada, Hachioji (JP)

(73) Assignee: KONICA MINOLTA OPTO, INC., Tokyo (JP)

( * ) Notice: Subject to any disclaimer, the term of this patent is extended or adjusted under 35 U.S.C. 154(b) by 1018 days.

(21) Appl. No.: 13/257,866

(22) PCT Filed: Mar. 11, 2010

(86) PCT No.: PCT/JP2010/054094
§ 371 (c)(1),
(2), (4) Date: Sep. 20, 2011

(87) PCT Pub. No.: WO2010/116843
PCT Pub. Date: Oct. 14, 2010

(65) Prior Publication Data
US 2012/0007262 A1    Jan. 12, 2012

(30) Foreign Application Priority Data
Apr. 7, 2009    (JP) ................. 2009-092760

(51) Int. Cl.
*B29D 11/00*    (2006.01)
*B29C 43/02*    (2006.01)
(Continued)

(52) U.S. Cl.
CPC .......... *B29C 43/021* (2013.01); *B29D 11/0048* (2013.01); *B29D 11/00951* (2013.01); *G11B 7/1374* (2013.01); *B29C 2043/046* (2013.01); *B29L 2011/0016* (2013.01)

(58) Field of Classification Search
USPC .................................... 264/1.1, 2.5; 425/808

IPC ........... B29C 43/021,2043/046; B29D 11/0048, B29D 11/00951; B29L 2011/0016; G11B 7/1374
See application file for complete search history.

(56) References Cited

U.S. PATENT DOCUMENTS

| | | | |
|---|---|---|---|
| 7,355,686 | B2 | 4/2008 | Fujita et al. |
| 2004/0190428 | A1 | 9/2004 | Ito et al. |

(Continued)

FOREIGN PATENT DOCUMENTS

| | | |
|---|---|---|
| CN | 1281532 C | 10/2006 |
| JP | 2002-96332 A | 4/2002 |

(Continued)

OTHER PUBLICATIONS

International Search Report in International Application No. PCT/JP2010/054094, dated Jun. 8, 2010, 1 page.

(Continued)

*Primary Examiner* — Mathieu Vargot
(74) *Attorney, Agent, or Firm* — Brinks Gilson & Lione (57) ABSTRACT

Provided is a method for manufacturing optical elements, the method including the following processes: a process to determine the wave-front aberration for a lens fabricated using a reference die, and then choose the integer multiple of a predetermined constant that is closest to the difference between a lens design value and the wave-front aberration for the lens fabricated using the reference die; and a process to determine the amount of aberration correction that cancels out the aforementioned integer multiple aberration, change the lens design so that either the low-order spherical aberration or the low-order astigmatism therefor becomes equal to the aberration correction, and fabricate a correction die from either a first or a second die, with the shape of the molding surface thereof changed on the basis of the changed design value. Then the die design value is decided upon, yielding a final die.

6 Claims, 5 Drawing Sheets

(51) Int. Cl.
*G11B 7/1374* (2012.01)
*B29C 43/04* (2006.01)
*B29L 11/00* (2006.01)

(56) References Cited

U.S. PATENT DOCUMENTS

| | | |
|---|---|---|
| 2004/0244422 A1 | 12/2004 | Yoneda et al. |
| 2005/0210922 A1 | 9/2005 | Tanaka et al. |
| 2007/0229964 A1 | 10/2007 | Yoneda et al. |
| 2008/0028794 A1 | 2/2008 | Yoneda et al. |

FOREIGN PATENT DOCUMENTS

| | | |
|---|---|---|
| JP | 2002-096344 | 4/2002 |
| JP | 2004-82352 A | 3/2004 |
| JP | 2004-292276 A | 10/2004 |
| JP | 2004-299934 A | 10/2004 |
| JP | 2005-283783 A | 10/2005 |
| WO | WO2007-142100 A1 | 12/2007 |

OTHER PUBLICATIONS

Office Action in Chinese Application No. 201080015191.9 dated Jun. 26, 2013, and English language translation, 14 pages.

METHOD OF MANUFACTURING OPTICAL ELEMENTS

This application is a National Stage application of International Application No. PCT/JP2010/054094, filed Mar. 11, 2010.

TECHNICAL FIELD

The present invention relates to a method of manufacturing optical elements.

BACKGROUND

In optical disc devices in which optical discs such as DVDs (digital video discs) are used as recording media, for optical pick-up devices thereof, pick-up lenses produced by molding glass or plastics are used. Over recent years, in optical discs, blue wavelength is used, and thereby in pick-up lenses, severe lens shape accuracy in the order of 0.1 μm is required. Thereby, even when molding is carried out using a die produced based on a lens design value, a desired lens shape or optical performance may not be realized. This fact results from occurrence of thermal contraction of a lens material and a die. Therefor, methods of die production in which these factors are considered in advance have been proposed.

For example, a method is proposed in which the amount of deviation from a design value of the spherical aberration of a provisional lens molded using a tentative die produced using a design value is detected and then with respect to the amount of deviation, a table, in which of design values of dies, the relationship between a high-order aspherical constant and a spherical aberration amount generated thereby is determined in advance, is referred to and of corresponding aspherical constants, the amount of small change of high-order term is added to an aspherical constant as an adjusting value to design a final molding die (refer to Patent Document 1).

In the method disclosed in Patent Document 1, it is necessary to prepare, in advance, a table in which the relationship between the amount of small change of high-order term regarding an aspherical constant of an aspherical expression and the amount of variation of a spherical aberration value is determined. However, to enhance the accuracy of this table, it is necessary to fabricate a large number of dies and thereby to press a large number and a wide variety of lenses to measure optical performance.

To solve such problems, a method is proposed in which the wavefront aberration of a first tentative optical element molded using a tentative die produced using a design value is measured and then a correction wavefront aberration so as to offset the wavefront aberration is calculated to design a second tentative optical element in which the shape is optimized so as to have the correction wavefront aberration; and based on the shape of the second tentative optical element, a regular die to mold regular optical elements is designed (refer to Patent Document 2).

Further, the method disclosed in Patent Document 1 cannot respond to an unexpected aberration which is not provided in the table.

Therefore, a method is proposed in which a lens is molded using a provisional die produced using a design value, and when the spherical aberration of the thus-molded lens has deviated from a predetermined value, the amount of deviation is adjusted by lens thickness (axial thickness) (refer to Patent document 3).

PRIOR ART DOCUMENTS

Patent Documents

Patent Document 1: Unexamined Japanese Patent Application Publication No. 2002-96344

Patent Document 2: Unexamined Japanese Patent Application Publication No. 2004-299934

Patent Document 3: Unexamined Japanese Patent Application Publication No. 2004-82352

BRIEF DESCRIPTION OF THE INVENTION

Problems to be Solved by the Invention

However, in the method disclosed in Patent document 2, on the basis of the shape of a second tentative optical element so as to offset the wavefront aberration of a first tentative optical element molded using a tentative die, a regular die is designed. Therefore, every time one die is produced, a second tentative optical element needs to be designed and as a result, regular dies each differ in shape. Thereby, steps to produce a regular die are cumbersome and time-consuming, and the above method is unsuitable for the case where a large number of regular dies are produced for mass-production.

On the other hand, in cases in which spherical aberration is corrected only by axial thickness as disclosed in Patent Document 3, when the correction amount is large, the axial thickness may markedly depart from the design value. Further, since the relationship between axial thickness and spherical aberration differs in each order, when high-order aberration is adjusted together with low-order spherical aberration, any optimal axial thickness to satisfy both performances may not exist and thereby there is a limitation with respect to spherical aberration amount able to be adjusted only by the axial thickness.

In view of the above problems, the present invention was completed, and an object thereof is to provide a method of manufacturing optical elements enabling to manufacture high-performance lenses having appropriately corrected aberration using a simple method.

Means to Solve the Problems

To solve the above problems, the present invention has the flowing features.

1. A method of manufacturing optical elements to produce lenses by press-molding a molding material using a molding die containing a first die having a first molding surface and a second die having a second molding surface, the method comprising:

a step to produce a reference molding die based on a die design value in which a lens design value is determined and based on the lens design value, the die design value containing a shape of the first molding surface, a shape of the second molding surface, and a distance between the first molding surface and the second molding surface (hereinafter referred to as an inter-die distance) is determined;

a step in which a specific aberration value of either of a low-order spherical aberration and a low-order astigmatism of a lens produced using the reference molding die is determined and when the specific aberration value exceeds a predetermined range, of a plurality of predetermined values, a value closest to a difference between the specific aberration value of a lens produced using the reference molding die and the lens design value is determined as an approximate aberration amount;

a step to produce lenses using a correction molding die in which a correction aberration amount to offset the approximate aberration amount is determined to change the lens design value so as for the specific aberration to have the correction aberration amount and based on the thus-changed value, the shape of either of the molding surfaces of the first die and the second die is changed; and a step in which the specific aberration value of a lens produced using the correction molding die is determined to determine whether the thus-determined specific aberration value falls within a predetermined range, wherein, when the thus-determined value falls within the predetermined range, another die design value is determined and then based on the another design value, lenses are produced.

2. The method of manufacturing optical elements described in item 1, wherein the plurality of predetermined values are integral multiple values of a predetermined constant excluding 0.

3. The method of manufacturing optical elements described in item 1 or 2, wherein the specific aberration is a third-order spherical aberration or a fifth-order aberration; after the determined specific aberration value has been determined to fall within a predetermined range in the step to determine whether to fall within the predetermined range, a step to measure an axial thickness and the aberration of a lens produced using the correction molding die and a step to correct the inter-die distance based on a measurement result in the step to measure the axial thickness and the aberration are performed to determine a die design value; and lenses are produced based on the design value.

4. The method of manufacturing optical elements described in item 1 or 2, wherein the specific aberration is any of a third-order spherical aberration, a fifth-order spherical aberration, and a third-order astigmatism.

5. The method of manufacturing optical elements described in any of items 1-4, wherein the specific aberration value of the lens produced using the reference molding die and the specific aberration value of a lens produced using the correction molding die contain aberration amount to be generated in a post-step performed after lens molding.

6. The method of manufacturing optical elements described in any of items 1-5, wherein in the step to produce lenses using the correction molding die, of the first die and the second die, a shape of a die having a molding surface of smaller curvature is changed.

Effects of the Invention

According to the present invention, when a specific aberration value of a produced lens exceeds a predetermined range, of integral multiple values of a predetermined constant, a value closest to the difference between a specific aberration value and a lens design value is calculated as an approximate aberration amount. Subsequently, using a correction molding die employing a die in which either of the shape of a first molding surface and the shape of a second molding surface is changed so as to offset the approximate aberration value, a lens is produced. The approximate aberration value is a limited value, enabling to easily design and produce a correction molding die.

When the wavefront aberration value of a produced lens falls within a predetermined range, based on a measurement result of the axial thickness and the aberration of a lens produced using a correction molding die, inter-die distance is corrected for fine adjustment to make a correction to obtain aberration of a desired range.

When such a manner is employed, a method of manufacturing optical elements enabling to manufacture high-performance lenses having appropriately corrected aberration using a simple method can be provided.

PREFERRED EMBODIMENTS OF THE INVENTION

With reference to the drawings, one embodiment according to the present invention will now be described but the present invention is not limited to the embodiment.

Figure 1:
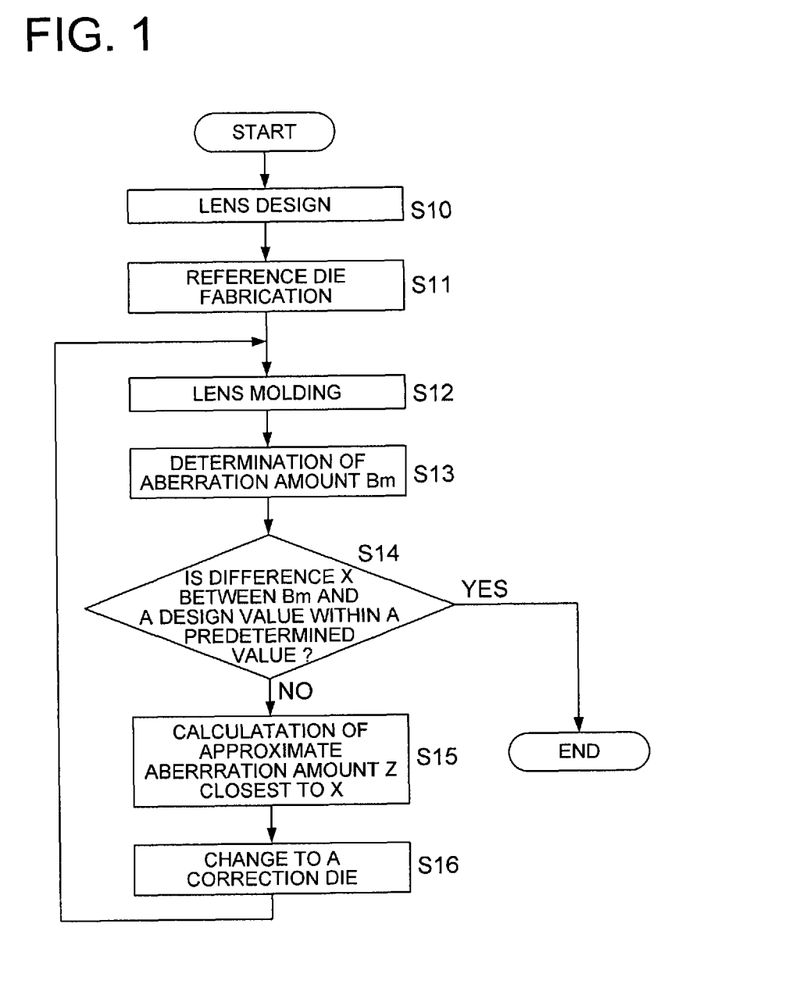
FIG. 1 is a flowchart to describe one example of the procedure of the method of manufacturing optical elements of a first embodiment.

FIG. 1 is a flowchart to describe one example of the procedure of the method of manufacturing optical elements of the first embodiment. The following description will be made in the order of the flowchart of FIG. 1.

S10: A step to deign a lens

Using a commercially available lens design software (for example, "CODE V" produced by Cybernet Systems Co., Ltd.), shape is optimized so as for wavefront aberration amount to be 0 to optically design a reference lens.

A lens design value includes, for example, the refractive index of a lens material, the shape of a first surface, the shape of a second surface, and axial thickness. The lens design value is set to allow a lens to have desired optical performance.

Incidentally, in the present invention, a first face of a lens is designated as a face molded by a first molding surface and a second face of the lens is designated as a face molded by a second molding surface.

S11: A step to design a reference molding die

On the basis of the lens design value of a reference lens designed in S10, a die design value containing the shape of the first molding surface, the shape of the second molding surface, and the distance between the first molding surface and the second molding surface (i.e., the inter-die distance) is determined and then based on this die design value, a reference molding die is produced.

The die design value of such a reference molding die is determined based on a lens design value. In this case, the thermal contractions (the thermal expansion rates) of a lens material used as a material and a molding die material are also taken into account.

In production of a reference molding die based on the die design value, any appropriate conventional shape working method is usable as is.

S12: A step to mold a lens

Using the produced reference molding die, a reference lens is produced. As the molding method, usable is either of a reheating method in which a glass material (a preform) arranged between 2 dies is softened by heating to be pressed and a liquid droplet method in which a predetermined mass of a molten glass droplet is directly received by one die and pressed using the other die. In the liquid droplet method, the generated amount of error in lens production is large compared with the reheating method. However, when the present invention is applied, a high-performance lens having appropriately corrected aberration is obtained. Further, as the lens material, not only glass but also plastics are applicable. In this case, a molding method such as injection molding is employable.

S13: A step to determine aberration amount Bm

The transmission wavefront aberration of a reference lens immediately after molding is measured using an interferometer. Then, using a commercially available analysis software, the thus-measured transmission wavefront aberration is developed in Zernike polynomials to obtain a Zernike coefficient. From this result, at the measuring wavelength of any specific aberration of pre-selected third-order spherical aberration (SA3), fifth-order spherical aberration (SA5), third-order astigmatism (AS3X), and third-order astigmatism (AS3Y), aberration amount Bm is determined. Aberration tends to vary specifically with the individual difference of a die and molding conditions. SA3 having large adjustment margin is preferably selected as the specific aberration.

Herein, m represents the number of times of measurement of wavefront aberration. When in the following description, the number of times needs to be distinguished, aberration amount measured first is designated as $B_1$ and aberration amount measured secondly is designated as $B_2$.

S14: A step to determine whether the difference X between aberration amount Bm and a design value falls within a predetermined value S15: When the difference X between aberration amount Bm and a design value exceeds a predetermined value, a value closest to the difference X is calculated among a plurality of predetermined values as approximate aberration amount Z.

A plurality of values predetermined as approximate aberration amounts Z are determined with consideration of the shape of a lens and the die material from an assumed range of the value of the difference X.

To allow a plurality of such predetermined values to be arranged at predetermined intervals, constant P is determined and then integral multiple values of constant P excluding 0 are employed.

For example, when aberration amount Bm is −0.035λ and the design value is 0, the difference X is −0.035λ. Further, for example, when constant P is 0.02λ and values of integer n except 0 are −3, −2, −1, 1, 2, and 3, the values of nP are −0.06λ, −0.04λ, −0.02λ, 0.02λ, 0.04λ, and 0.06λ. In this case, approximate aberration amount Z closest to the difference X is −0.04λ.

The absolute value of constant P is predetermined in the range of 0.022λ-0.10λ in view of the shape of a lens and the die material. For example, in the case of a lens having large volume, P is preferably large compared with a small lens. Further, the range of approximate aberration amount Z is appropriately changed depending on the shape of a lens, the die material, and the lens material, being about −0.5λ-0.5λ, for example, in the case of pick-up lenses used for optical discs.

When such a manner is employed, the design and production of a correction molding die can be simplified.

S16: A step to change to a correction molding die

On the basis of a lens design value re-designed so as to generate correction aberration amount −Z to offset approximate aberration amount Z calculated in S15, a correction molding die in which the shape of the first molding surface and the shape of the second molding surface have been changed is produced.

For example, when approximate aberration amount Z is −0.04λ, the correction aberration amount to offset this amount is 0.04λ. Using a lens design software, the shape of either of the first face of a lens and the second face thereof is changed and then a lens shape in which a specific aberration has a predetermined correction aberration amount is re-designed. Of the first face and the second face, in a face having larger approximate curvature radius, a large production error is generated. Then, even when a specific aberration is intended to be corrected, due to production variation, correction may not be accurately made. Therefor, it is preferable that the shape of a face having smaller approximate curvature radius in which production variation can be decreased is changed to correct aberration.

Subsequently, on the basis of a value re-designed so as to result in a correction aberration amount of 0.04λ, a die, in which the shape of the molding surface of either of dies to mold the first molding surface and the second molding surface has been changed, is produced to make a change to a correction molding die constituted of a die in which the shape of the molding surface has been changed and a reference molding die of the other.

Herein, in the present invention, since the value of correction aberration amount is limited in advance, it is possible that correction molding dies corresponding to the value of correction aberration amount previously assumed prior to the present step are designed and produced to make a selection therefrom based on approximate aberration amount Z calculated in S15.

Subsequently, a return to S12 is made to mold a lens using a correction molding die. Aberration amount $B_2$ of a lens molded using the correction molding die is determined based on the procedure of S13. In S14, a determination is made whether the difference X between aberration amount $B_2$ and a design value falls within a predetermined value. When the difference X between aberration amount $B_2$ and the design value falls within the predetermined value, a determination as a final molding die is made.

In this manner, using a simple procedure, the die design value is determined, and using a final molding die, a lens falling within a predetermined aberration range can be produced.

Figure 2:
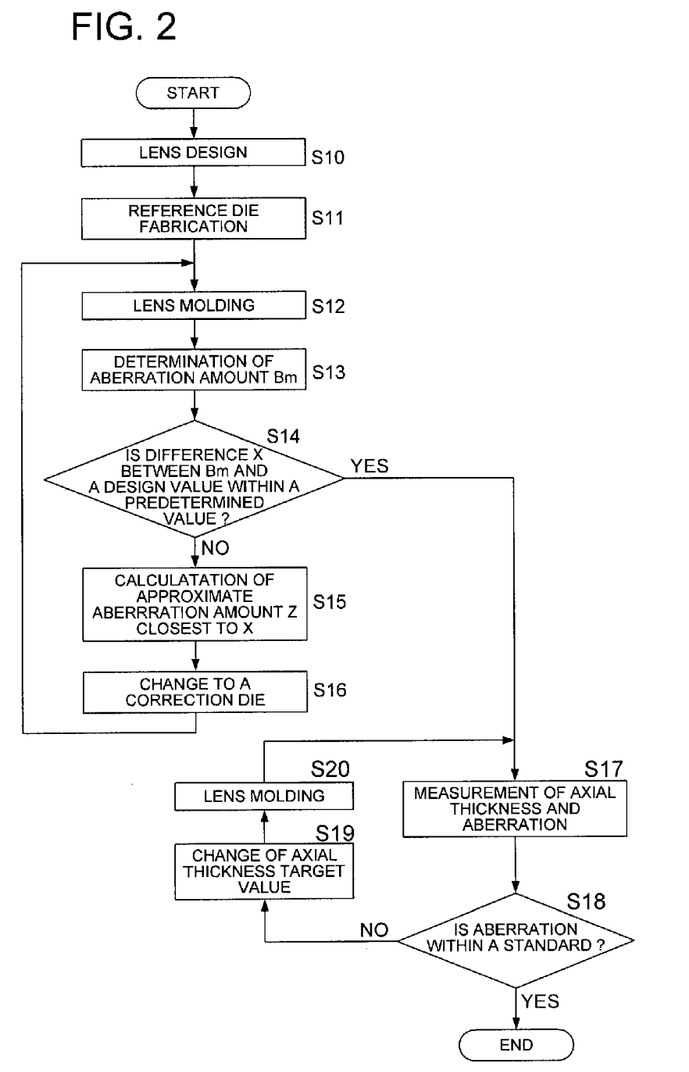
FIG. 2 is a flowchart to describe one example of the procedure of the method of manufacturing optical elements of a second embodiment.

Next, the second embodiment will be described. FIG. 2 is a flowchart to describe one example of the procedure of the method of manufacturing optical elements of the second embodiment. The second embodiment differs from the first embodiment in that aberration previously selected as a specific aberration in S13 is low-order spherical aberration, and after determination of a final molding die, based on a measurement result of the axial thickness and the aberration of a lens molded using the final molding die, the target value of the axial thickness is changed for fine adjustment.

The following description will be made in the order of the flowchart of FIG. 2. Herein, in the same steps as in the first embodiment, detailed description will be omitted.

S10: A step to design a lens

Using a commercially available lens design software, shape is optimized so as for wavefront aberration amount to be 0 to optically design a reference lens.

S11: A step to design a reference molding die

On the basis of the lens design value of a reference lens designed in S10, a die design value containing the shape of the first molding surface, the shape of the second molding surface, and the distance between the first molding surface and the second molding surface (i.e., the inter-die distance) is determined and then based on this die design value, a reference molding die is produced.

S12: A step to mold a lens

Using the produced reference molding die, a reference lens is produced. As the molding method, usable is either of a reheating method in which a glass material (a preform) arranged between 2 dies is softened by heating to be pressed and a liquid droplet method in which a predetermined mass of a molten glass droplet is directly received by one die and pressed using the other die. Further, as the lens material, not only glass but also plastics are applicable. In this case, a molding method such as injection molding is employable.

S13: A step to determine aberration amount Bm

The transmission wavefront aberration of a reference lens immediately after molding is measured using an interferometer. Then, using a commercially available analysis software, the thus-measured transmission wavefront aberration is developed in Zernike polynomials to obtain a Zernike coefficient. From this result, at the measuring wavelength of either of specific aberrations of pre-selected third-order spherical aberration (SA3) and fifth-order spherical aberration (SA5), aberration amount Bm is determined. Aberration tends to vary specifically with the individual difference of a die and molding conditions. SA3 having large adjustment margin is preferably selected as the specific aberration.

Herein, m represents the number of times of measurement of wavefront aberration. When in the following description, the number of times needs to be distinguished, aberration amount measured first is designated as $B_1$ and aberration amount measured secondly is designated as $B_2$.

S14: A step to determine whether the difference X between aberration amount Bm and a design value falls within a predetermined value.

S15: When the difference X between aberration amount Bm and a design value exceeds a predetermined value, a value closest to the difference X is calculated among a plurality of predetermined values as approximate aberration amounts Z.

A plurality of values predetermined as approximate aberration amounts Z are determined with consideration of the shape of a lens and the die material from an assumed range of the value of the difference X.

To allow a plurality of such predetermined values to be arranged at predetermined intervals, constant P is determined and then integral multiple values of constant P excluding 0 are employed.

The value of constant P is predetermined in the range of $0.02\lambda$-$0.10\lambda$ in view of the shape of a lens and the die material. For example, in the case of a lens having large volume, P is preferably large compared with a small lens. Further, the range of approximate aberration amount Z is appropriately changed depending on the shape of a lens, the die material, and the lens material, being about $-0.5\lambda$-$0.5\lambda$, for example, in the case of pick-up lenses used for optical discs.

When such a manner is employed, the design and production of a correction molding die can be simplified.

S16: A step to change to a correction molding die

On the basis of a lens design value re-designed so as to generate correction aberration amount $-Z$ to offset approximate aberration amount Z calculated in S15, a correction molding die in which the shape of the first molding surface and the shape of the second molding surface have been changed is produced.

For example, when approximate aberration amount Z is $-0.04\lambda$, the correction aberration amount to offset this amount is $0.04\lambda$. Using a lens design software, the shape of either of the first face of a lens and the second face thereof is changed and then a lens shape in which a specific aberration has a predetermined correction aberration amount is re-designed. Of the first face and the second face, in a face having larger approximate curvature radius, a large production error is generated. Then, even when a specific aberration is intended to be corrected, due to production variation, correction may not be accurately made. Therefor, it is preferable that the shape of a face having smaller approximate curvature radius in which production variation can be decreased is changed to correct aberration.

Subsequently, on the basis of a value re-designed so as to result in a correction aberration amount of $0.04\lambda$, a die, in which the shape of the molding surface of either of dies to mold the first molding surface and the second molding surface has been changed, is produced to make a change to a correction molding die constituted of a die in which the shape of the molding surface has been changed and a reference molding die of the other.

Herein, in the present invention, since the value of correction aberration amount is limited in advance, it is possible that correction molding dies corresponding to the value of correction aberration amount previously assumed prior to the present step are designed and produced to make a selection therefrom based on approximate aberration amount Z calculated in S15.

Subsequently, a return to S12 is made to mold a lens using a correction molding die. Aberration amount $B_2$ of a lens molded using the correction molding die is determined based on the procedure of S13. In S14, a determination is made whether the difference X between aberration amount $B_2$ and a design value falls within a predetermined value. When the difference X between aberration amount $B_2$ and the design value falls within the predetermined value, a determination as a final molding die is made and then a progress to S17 is made.

S17: A step to measure axial thickness and aberration

The axial thickness and the aberration of a lens produced using a final molding die are measured to confirm variation. The aberration to be measured includes plural ones containing also aberrations used for correction such as, for example, third-order spherical aberration (SA3), fifth-order spherical aberration (SA5), seventh-order spherical aberration (SA7), and ninth-order spherical aberration (SA9).

To confirm variation, a larger number of lenses to be measured are preferable. In designing, when the relationship between each aberration and axial thickness can be predicted, even one lens may be sufficient.

S18: A step to determine whether aberration falls within a standard

This is a step to determine whether each aberration falls within a predetermined value in a predetermined range from the axial thickness of a design value.

S19: In a predetermined variation range from the axial thickness of a design value, when any of aberrations exceeds the predetermined value, the target value of the axial thickness is changed.

S20: A step to mold a lens

Via the same molding method as in S12, using a final molding die, a change is made to an inter-die distance corresponding to the target value of the axial thickness to produce a lens.

A return to S17 is made, and then axial thickness and aberration are measured. Such a manner is then repeated until in S18, the variation between the axial thickness and each aberration falls within a predetermined range.

When in a predetermined range from the axial thickness of a design value, all aberrations to be evaluated fall within a predetermined value, inter-die distance is determined. In this manner, based on a determination result of the axial thickness and the aberration of a lens produced using a final molding die, inter-die distance is corrected for fine adjustment, and thereby a lens in which even high-order spherical aberration is corrected using a simple procedure can be manufactured.

Figure 3:
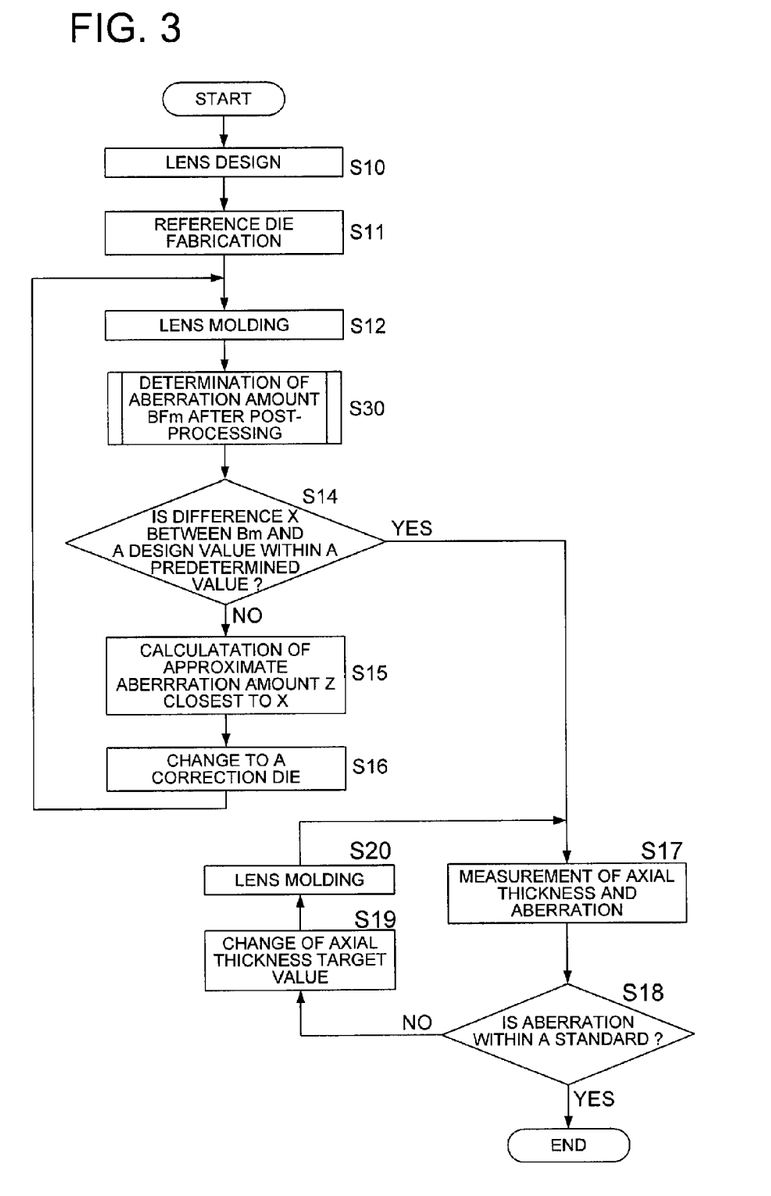
FIG. 3 is a flowchart to describe one example of the procedure of the method of manufacturing optical elements of a third embodiment.

Next, the method of manufacturing optical elements of the third embodiment will be described.

Figure 4:
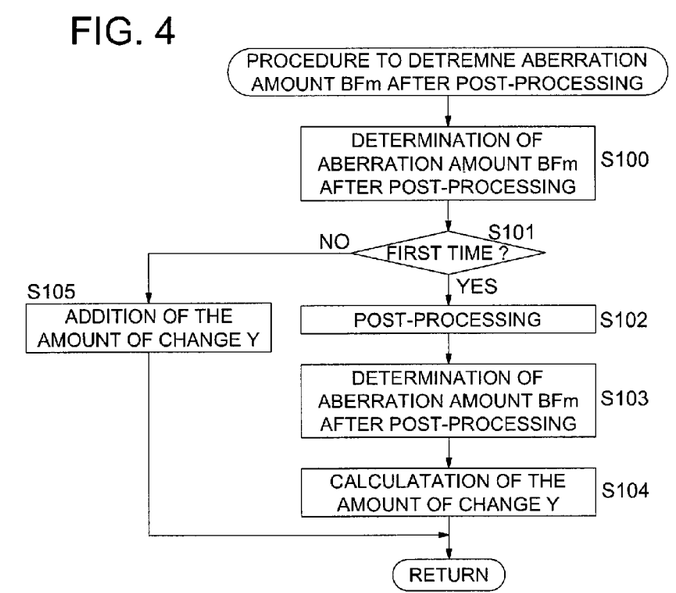
FIG. 4 is a flowchart to describe one example of the procedure to determine wavefront aberration after post-processing.

FIG. 3 is a flowchart to describe one example of the procedure of the method of manufacturing optical elements of the third embodiment, and FIG. 4 is a flowchart to describe the procedure to determine wavefront aberration after post-processing.

FIG. 3 differs from FIG. 2 showing the flowchart of the second embodiment in that the step to determine aberration amount Bm of S13 is changed to a step to determine aberration amount BFm after post-processing. In other steps, the same procedures are employed except use of aberration amount BFm instead of aberration amount Bm. Therefore, the same numbers are assigned and then description thereof will be omitted.

S30: A step to determine aberration amount BFm after post-processing

In the third embodiment, to correct aberration variation from a design value generated via post-processing carried out in post-steps such as core removal, washing, annealing, and coating after molding, the transmission wavefront aberration of a lens after post-processing is measured using an interferometer. Subsequently, in the same manner as in the second embodiment, using a commercially available analysis software, the thus-measured transmission wavefront aberration is developed in Zernike polynomials to obtain a Zernike coefficient. From this result, at the measuring wavelength of either of the third-order spherical aberration (SA3) and the fifth-order spherical aberration (SA5), aberration amount BFm after post-processing is determined.

In following steps, a die design value to correct aberration amount BFm after post-processing is determined and then a final molding die is obtained.

One example of the procedure of the step to determine aberration amount BFm after post-processing will be described with reference to the flowchart of FIG. 3.

S100: A step to determine aberration amount Bm prior to post-processing

Using the same procedure as in S13, aberration amount Bm prior to post-processing of a lens produced in S12 is determined.

S101: A step to determine whether aberration amount Bm is determined for the first time S102: In the case of the first time, a lens produced in S12 is subjected to post-processing such as core removal, washing, annealing, and coating based on the procedure performed during mass-production.

S103: Using the same procedure as in S13, aberration amount BFm of a lens after post-processing is determined.

S104: The amount of change Y is determined. The difference between aberration amount BFm after post-processing and aberration amount Bm prior to post-processing is calculated to be designated as the amount of change Y.

S105: In the case of the second time or more, the amount of change Y is added to aberration amount Bm prior to post-processing measured in S100 to be designated as aberration amount BFm after post-processing.

The amount of change Y does not vary to a large extent even if a molding die changes. Thereby, as described in this flowchart, a molding die is replaced for the second time or more and even if a lens molded using a molding die when the amount of change Y has been calculated and another die is not subjected to post-processing again, aberration amount BFm after post-processing can be determined by adding the amount of change Y to aberration amount Bm prior to post-processing.

In the present embodiment, a die design value to correct aberration amount BFm after post-processing determined in such a manner is determined using the same procedure as in the first embodiment to obtain a final molding die. Thereby, even after a lens has been subjected to post-steps, desired optical performance can be realized.

Incidentally, in FIG. 3, an example, in which instead of aberration amount Bm in the steps of the second embodiment, aberration amount BFm after post-processing is used, has been described. Even in the first embodiment, aberration amount BFm after post-processing can be similarly used to produce the same effects.

EXAMPLE

An example to confirm effects of the present invention will now be described. However, the present invention is not limited thereto.

Figure 5:
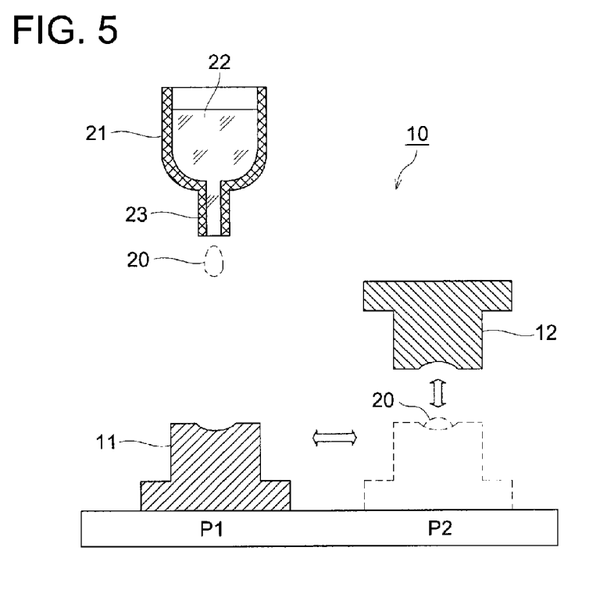
FIG. 5 is a view showing one example of the manufacturing apparatus of glass lenses.

Initially, the constitution of a manufacturing apparatus 10 of a glass lens used in EXAMPLE is described with reference to FIG. 5. As shown in FIG. 5, the manufacturing apparatus 10 of a glass lens has a melting tank 21 to pool a molten glass 22, a dripping nozzle 23 connected to the lower portion of the melting tank 21, a lower die 11 to receive a molten glass droplet 20, and an upper die 12 to press the molten glass droplet 20 together with the lower die 11.

The lower die 11 is constituted so as to be movable, by a drive member (not shown), between the position to receive the molten glass droplet 20 below the dripping nozzle 23 (dripping position P1) and the position to press-mold the molten glass droplet 20 opposed to the upper die 12 (pressing position P2).

In order for the lower die 11 and the upper die 12 to carry out press molding at a predetermined clearance or a predetermined pressing power, the upper die 12 is constituted so as to be movable up and down by a drive member (not shown).

As the material for the lower die 11 and the upper die 12, an ultrahard material (thermal expansion coefficient=$5.0 \times 10^{-6}/°$C.) formed of tungsten carbide as a main component was used.

A glass lens to be manufactured was determined to be a biconvex aspherical lens having an outer diameter of $\phi 3.5$ mm, an optical effective diameter of $\phi 2.5$ mm, and a thickness of the lens center (axial thickness) of 1.89 mm as a design value. As the glass material, a silica glass of a Tg of 480° C., a refractive index nd of about 1.6, and a thermal expansion coefficient of $12 \times 10^{-6}/°$ C. was used.

In EXAMPLE, based on the procedure of the third embodiment, a glass lens was produced. The following description will be made in the order of the flowchart of FIG. 3.

S10: A biconvex aspherical lens having an outer diameter of $\phi 3.5$ mm, an optical effective diameter of $\phi 2.5$ mm, and a thickness of the lens center (axial thickness) of 1.89 mm as a design value was designed. As the glass material, a silica glass of a Tg of 480° C., a refractive index nd of about 1.6, and a thermal expansion coefficient of $12 \times 10^{-6}/°$ C. was used.

Further, P=0.02λ and n was set to be −3, −2, −1, 1, 2, and 3. As a specific aberration, third-order spherical aberration SA3 was selected. Lens shapes resulting in 6 approximate aberration amounts Z in the range of −0.06λ-0.06λ of SA3 (Zernike coefficient Z09) were re-designed in advance.

S11: Deformation amount with consideration of the thermal expansion coefficients of the die and the glass material was added to the design shape (aspherical coefficient and curvature radius) of a lens to be manufactured, in which molding temperature was set at 450° C., to produce a reference upper die 12 and a lower die 11.

Further, in EXAMPLE, based on the lens shape having been re-designed in S10, molding temperature was set at 450° C. and then deformation amount with consideration of the thermal expansion coefficients of the die and the glass material was added. Then, upper dies 13a, 13b, 13c, 13d, 13e, and 13f, in which the shape of the upper die 12 having smaller approximate curvature radius than the lower die 11 had been corrected, were produced in advance as shown in Table 1.

TABLE 1

| | Upper Die | | | | | |
|---|---|---|---|---|---|---|
| | 13a | 13b | 13c | 13d | 13e | 13f |
| n | −3 | −2 | −1 | 1 | 2 | 3 |
| Z | −0.06λ | −0.04λ | −0.02λ | 0.02λ | 0.04λ | 0.06λ |

S12: Initially, using the manufacturing apparatus 10 of a glass lens, a glass lens (reference lens) was molded by the upper die 12 and the lower die 11 serving as a molding die.

In the molding step, initially, the lower die 11 is moved to the dripping position P1 immediately below the dripping nozzle 23 made of platinum to drip a molten glass droplet 20 and then the molten glass droplet 23 is received by the lower die 11. After the molted glass droplet 23 has been received by the lower die 11, the lower die 11 is moved to the pressing position P2 below the upper die 12. After 10 seconds after the lower die 11 has reached the pressing position P2, the upper die 12 is moved vertically to press the molten glass droplet 20 inside the lower die 11. The moving rate of the upper die 12 was set at 10 mm/sec. The pressing pressure of the upper die 12 was set at 0.49 kN. Then, the duration of maintaining the pressing pressure was set to be 10 seconds.

S30: The transmission wavefront aberration of a glass lens immediately after molding was measured using an interferometer (Model DVD400 Pro produced by Zygo KK). Subsequently, using an analysis software (MetroPro produced by Zygo KK), the thus-measured e transmission wavefront aberration was developed in Zernike polynomials to obtain a Zernike coefficient. Thereby, the third-order spherical aberration amount (SA3, Z09) at a measurement wavelength of 405 nm was determined to be −0.065λ.

This glass lens was subjected to annealing and AR coating (post-processing) and then using the above interferometer, optical performance was evaluated to be −0.035λ as SA3. Therefore, $BF_1$=−0.035λ and the amount of change Y=0.03λ.

S14: Since $BF_1$=−0.035λ and the design value is 0, the difference X is −0.035λ. The predetermined standard value of EXAMPLE is ±0.015λ and therefore the measurement result exceeds the standard value.

S15: Of approximate aberration amounts Z=−0.06λ, −0.04λ, −0.02λ, 0.02λ, 0.04λ, and 0.06λ, the value closest to −0.035λ as the difference X is −0.04λ. Therefore, approximate aberration amount Z=−0.04λ.

S16: As obvious from Table 1, a correction molding die to correct the approximate aberration amount=−0.04λ is the upper die 13e having an aberration of 0.04λ. Then, the upper die 12 of the manufacturing apparatus 10 of a glass lens is replaced with the upper die 13e.

S12: Using the manufacturing apparatus 10 of a glass lens, inter-die distance was adjusted so as for lens axial thickness to be 1.8900 mm. Then, using the upper die 13e and the lower die 11, 100 glass lenses (lenses after correction) were molded. Molding was carried out in the same manner as for the reference lens except that the upper die was changed.

S30: The transmission wavefront aberration of a glass lens immediately after molding was measured using an interferometer (Model DVD400 Pro produced by Zygo KK). Subsequently, using the same procedure as for the reference lens, the third-order spherical aberration amount (SA3) was determined and then an amount of change Y of 0.03λ was added. Thereby, aberration amount $BF_2$ was determined to be −0.010λ-+0.005λ.

S14: The difference X between aberration amount $BF_2$ and the design value fell within the predetermined standard (±0.015λ).

Figure 6:
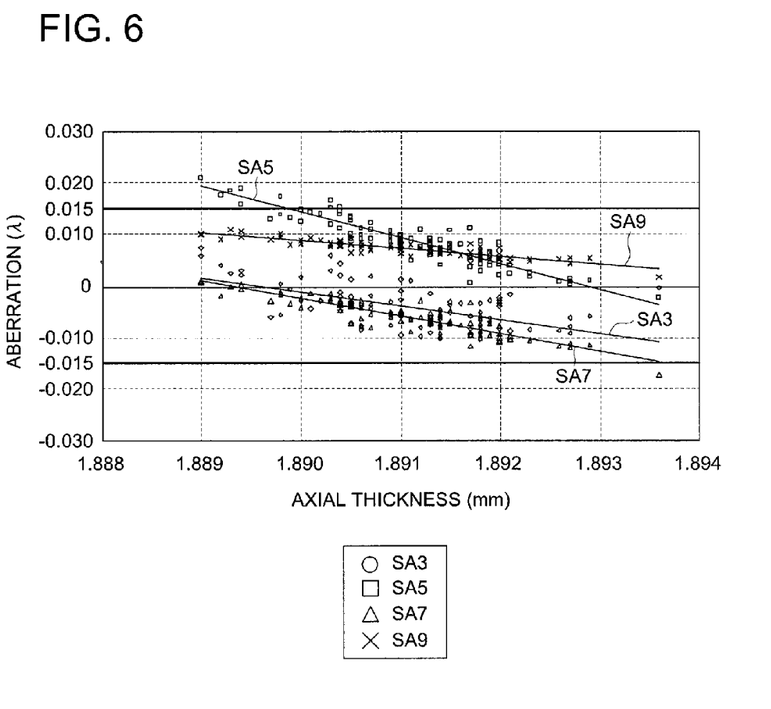
FIG. 6 is a graph showing the relationship between the axial thicknesses and the aberrations of lenses produced in EXAMPLE.

S17: The axial thickness, the third-order spherical aberration (SA3), the fifth-order spherical aberration (SA5), the seventh-order spherical aberration (SA7), and the ninth-order spherical aberration (SA9) of the lenses produced in S12 were measured. The measurement results are shown in FIG. 6.

S18: In the case of a lens having an axial thickness of 1.889 mm, SAs 3, 7, and 9 fall within the predetermined standard (±0.015λ). However, only SA5 has +0.02λ, exceeding the standard. Further, in a lens having an axial thickness of 1.894 mm, SAs 3, 5, and 9 fall within the standard. However, SA7 has −0.017λ, exceeding the standard.

S19: From the results of FIG. 6, the target value of the axial thickness was changed from 1.8900 mm to 1.8915 mm so as for the axial thickness to be in the range of 1.890 mm-1.893 mm.

S20, S17, and S18: The target value of the axial thickness was changed to 1.8915 mm to produce 100 lenses. In the same procedure, the axial thickness, the third-order spherical aberration (SA3), the fifth-order spherical aberration (SA5), the seventh-order spherical aberration (SA7), and the ninth-order spherical aberration (SA9) of the lenses were measured. All the measurement values fell within the predetermined standard (±0.015λ).

Herein, in EXAMPLE, an example to produce glass lenses has been described. However, the present invention is applicable to not only glass lenses but also plastic lenses.

As described above, the present invention can provide a method of manufacturing optical elements enabling to manufacture high-performance lenses having appropriately corrected aberration using a simple method.

REFERENCE SIGNS LIST

10 Manufacturing apparatus
11 Lower die
12 Upper die
20 Molten glass droplet
21 Melting tank
22 Molten glass
23 Dripping nozzle
P1 Dripping position
P2 Pressing position

The invention claimed is:
1. A method of manufacturing optical elements to produce lenses by press-molding a molding material using a molding die containing a first die having a first molding surface and a second die having a second molding surface, the method comprising:

producing a reference molding die based on a die design value in which a lens design value is determined and based on the lens design value, the die design value containing a shape of the first molding surface, a shape of the second molding surface, and an inter-die distance between the first molding surface and the second molding surface is determined;

determining a specific aberration value of either of a low-order spherical aberration or a low-order astigmatism of a lens produced using the reference molding die, and when the specific aberration value exceeds a predetermined range, of a plurality of approximate aberration values of already produced correction molding dies, an approximate aberration value that is closest to a difference between the specific aberration value of the lens produced using the reference molding die and the lens design value is determined as an approximate aberration amount;

determining a correction aberration amount to offset the approximate aberration amount to change the lens design value so as for the specific aberration to have the correction aberration amount and based on the thus-changed value, wherein based on the determined correction aberration amount the shape of either of the molding surfaces of the first die and the second die is changed so as to produce lenses using a correction molding die; and determining the specific aberration value of a lens produced using the correction molding die to determine whether the thus-determined specific aberration value falls within a predetermined range, wherein, when the thus-determined value falls within the predetermined range, another die design value is determined and then based on the another design value, lenses are produced.

2. The method of manufacturing optical elements described in claim 1, wherein the plurality of approximate aberration values of already produced correction molding dies are integral multiple values of a predetermined constant excluding 0.

3. The method of manufacturing optical elements described in claim 1, wherein the specific aberration is a third-order spherical aberration or a fifth-order aberration;

after the determined specific aberration value has been determined to fall within a predetermined range in during the process of determining whether the determined specific aberration value falls within the predetermined range, the following processes are e formed to determine a die design value:

measuring an axial thickness and the aberration of a lens produced using the correction molding die, and correcting the inter-die distance based on a measurement result in the process of measuring the axial thickness and the aberration of the lens produced using the correction molding die; and producing lenses based on the die design value.

4. The method of manufacturing optical elements described in claim 1, wherein the specific aberration is any of a third-order spherical aberration, a fifth-order spherical aberration, and a third-order astigmatism.

5. The method of manufacturing optical elements described in claim 1, wherein the specific aberration value of the lens produced using the reference molding die and the specific aberration value of a lens produced using the correction molding die contain aberration amount to be generated in a post-step performed after lens molding.

6. The method of manufacturing optical elements described in claim 1, wherein in producing lenses using the correction molding die, of the first die and the second die, a shape of a die having a molding surface of smaller curvature is changed.

* * * * *